(12) United States Patent
Tian et al.

(10) Patent No.: US 12,470,967 B2
(45) Date of Patent: Nov. 11, 2025

(54) CHANNEL STATE INFORMATION PROCESSING METHOD, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventors: Wenqiang Tian, Guangdong (CN);
Jiejiao Tian, Guangdong (CN);
Yingpei Huang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 416 days.

(21) Appl. No.: 18/071,195

(22) Filed: Nov. 29, 2022

(65) Prior Publication Data

US 2023/0085850 A1   Mar. 23, 2023

Related U.S. Application Data

(63) Continuation of application No. PCT/CN2020/093465, filed on May 29, 2020.

(51) Int. Cl.
H04W 24/10 (2009.01)
(52) U.S. Cl.
CPC ................... H04W 24/10 (2013.01)
(58) Field of Classification Search
CPC ..... H04W 24/10; H04L 1/0026; H04B 7/0626
See application file for complete search history.

(56) References Cited

U.S. PATENT DOCUMENTS

| | | | |
|---|---|---|---|
| 9,532,254 B2 | 12/2016 | Ko | |
| 9,713,165 B2 | 7/2017 | Nammi | |
| 10,567,054 B2 | 2/2020 | Liu | |
| 10,666,331 B2 | 5/2020 | Liu | |

(Continued)

FOREIGN PATENT DOCUMENTS

| | | |
|---|---|---|
| CN | 102694624 A | 9/2012 |
| CN | 103503332 A | 1/2014 |

(Continued)

OTHER PUBLICATIONS

Supplementary European Search Report in the European application No. 20937984.1, mailed on May 15, 2023. 9 pages.

(Continued)

*Primary Examiner* — Chuong A Ngo
(74) *Attorney, Agent, or Firm* — Ladas & Parry LLP

(57) ABSTRACT

Provided in the present application is a method for processing channel state information (CSI), including that: a first device determines a channel type of a channel; and the first device determines channel state indication information of the channel based on first determination manner corresponding to the channel type, the channel state indication information indicates channel state information; and the first device sends the channel state indication information and third indication information to a second device, the third indication information being configured to indicate a third determination manner for decoding the channel state indication information. There is further provided a first device and a second device in the present application.

19 Claims, 7 Drawing Sheets

(56) References Cited

U.S. PATENT DOCUMENTS

| | | | |
|---|---|---|---|
| 2014/0226509 A1* | 8/2014 | Ko | H04W 24/10 370/252 |
| 2015/0117352 A1 | 4/2015 | Nammi | |
| 2018/0287822 A1 | 10/2018 | Wang | |
| 2019/0181930 A1 | 6/2019 | Liu | |
| 2019/0349046 A1 | 11/2019 | Liu et al. | |
| 2020/0382228 A1 | 12/2020 | Studer | |
| 2021/0159993 A1 | 5/2021 | Studer | |

FOREIGN PATENT DOCUMENTS

| | | |
|---|---|---|
| CN | 107707285 A | 2/2018 |
| CN | 109316192 A | 2/2019 |
| CN | 109417718 A | 3/2019 |
| CN | 109150775 B | 3/2020 |
| WO | 2019152849 A1 | 8/2019 |

OTHER PUBLICATIONS

International Search Report in the international application No. PCT/CN2020/093465, mailed on Feb. 18, 2021.
Written Opinion of the International Search Authority in the international application No. PCT/CN2020/093465, mailed on Feb. 18, 2021.

* cited by examiner

Input layer    Hidden layer    Output layer

Input layer    Hidden layer    Hidden layer    Hidden layer    Output layer

CHANNEL STATE INFORMATION PROCESSING METHOD, ELECTRONIC DEVICE, AND STORAGE MEDIUM

CROSS REFERENCE TO RELATED APPLICATION

This is a continuation of International Patent Application No. PCT/CN2020/093465 filed on May 29, 2020, the disclosure of which is hereby incorporated by reference in its entirety.

BACKGROUND

In the related art, how to efficiently and accurately transmit CSI for a channel environment changing in real time for different channels or a channel has not yet been clear.

SUMMARY

The present application relates to the technical field of wireless communication. Embodiments of the present application provide a CSI processing method, an electronic device, and a storage medium, which achieves efficient and accurate transmission of CSI for a channel environment changing in real time for different channels or a channel.

In a first aspect, the embodiments of the present application provide a method for processing CSI, which may include that: a first device determines a channel type of a channel; and the first device determines channel state indication information of the channel based on a first determination manner corresponding to the channel type.

In a second aspect, the embodiments of the present application provide a method for processing CSI, which may include that: a second device receives channel state indication information of a channel and a channel type of the channel; and the second device determines CSI corresponding to the channel state indication information based on a third determination manner corresponding to the channel type.

In a third aspect, the embodiments of the present application provide a first device. The first device may include: a first processing unit, configured to determine a channel type of a channel, and determine channel state indication information of the channel based on a first determination manner corresponding to the channel type.

In a fourth aspect, the embodiments of the present application provide a second device. The second device may include: a second receiving unit and a third processing unit. The second receiving unit may be configured to receive channel state indication information of a channel and a channel type of the channel.

The third processing unit may be configured to determine CSI corresponding to the channel state indication information based on a third determination manner corresponding to the channel type.

In a fifth aspect, the embodiments of the present application provide a first device, which may include: a processor and a memory configured to store a computer program capable of running on the processor. Herein, the processor is configured to perform, when executing the computer program, the steps of the method for processing CSI executed by the first device as described above.

In a sixth aspect, the embodiments of the present application provide a second device, which may include: a processor and a memory configured to store a computer program capable of running on the processor. Herein, the processor is configured to perform, when executing the computer program, the steps of the method for processing CSI executed by the second device as described above.

In a seventh aspect, the embodiments of the present application provide a chip, which may include: a processor, configured to call from a memory and run a computer program to enable a device installed with the chip to perform the method for processing CSI executed by the first device as described above.

In an eighth aspect, the embodiments of the present application provide a chip, which may include: a processor, configured to call from a memory and run a computer program to enable a device installed with the chip to perform the method for processing CSI executed by the second device as described above.

In a ninth aspect, the embodiments of the present application provide a storage medium, storing an executable program that, when executed by a processor, implements the method for processing CSI executed by the first device as described above.

In a tenth aspect, the embodiments of the present application provide a storage medium, storing an executable program that, when executed by a processor, implements the method for processing CSI executed by the second device as described above.

In an eleventh aspect, the embodiments of the present application provide a computer program product, which may include: a computer program instruction. The computer program instruction enables a computer to perform the method for processing CSI executed by the first device as described above.

In a twelfth aspect, the embodiments of the present application provide a computer program product, which may include: a computer program instruction. The computer program instruction enables a computer to perform the method for processing CSI executed by the second device as described above.

In a thirteenth aspect, the embodiments of the present application provide a computer program, enabling a computer to perform the method for processing CSI executed by the first device as described above.

In a fourteenth aspect, the embodiments of the present application provide a computer program, enabling a computer to perform the method for processing CSI executed by the second device as described above.

In the method for processing CSI, the electronic device, and the storage medium provided by the embodiments of the present application, the method includes that: a first device determines a channel type of a channel; and the first device determines channel state indication information of the channel based on a first determination manner corresponding to the channel type. In this way, the CSI is transmitted based on the channel type, which not only reduces the complexity of the first determination manner and the third determination manner, but also improves the performance and utilization effect of the first determination manner and the third determination manner. Therefore, the CSI is efficiently and accurately transmitted between the first device and the second device.

DETAILED DESCRIPTION

In order to understand the features and technical contents of the embodiments of the present application in more detail, implementations of the embodiments of the present application will be described in detail below with reference to the accompanying drawings, and the accompanying drawings are for illustrative purposes only and are not intended to limit the embodiments of the present application.

Before detailed description of the embodiments of the present application, Channel State Information (CSI) and artificial intelligence are briefly described.

Figure 1:
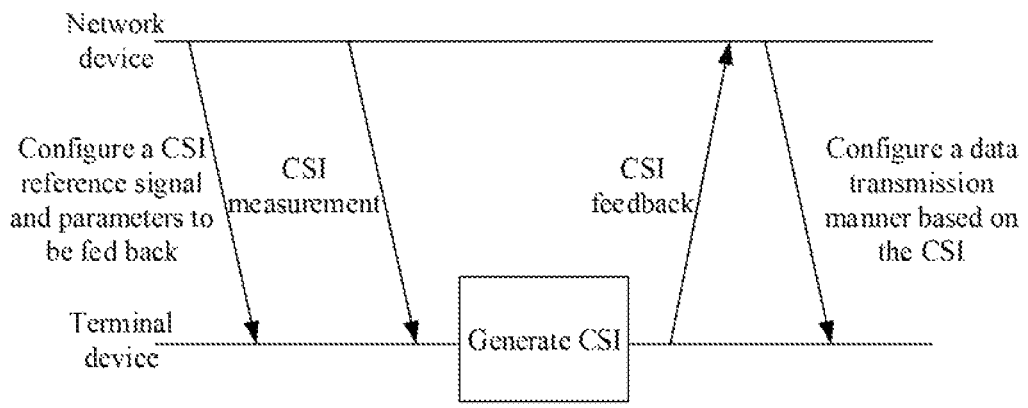
FIG. 1 is a schematic diagram of a feedback process of CSI indication in the present application.

In a Long Term Evolution (LTE) system and a New Radio (NR) system, a terminal device needs to report CSI indication to a network device, the CSI indication is very important in both the LTE system and the NR system, and the CSI indication determines the performance of data transmission in Multiple Input Multiple Output (MIMO) scenarios. Generally, the CSI indication in an existing system may include indication of information such as a Channel Quality Indicator (CQI), a Precoding matrix indicator (PMI), and a Rank indicator (RI). FIG. 1 shows a feedback flow of a CSI indication. A network device pre-configures indication parameter information for a CSI indication, for example, the network device configures which information in the information such as the CQI, the PMI and the RI needs to be indicated in the CSI indication by the terminal device. At the same time, the network device configures some reference signals, such as a Synchronization Signal Block (SSB) or a Channel-State Information Reference Signal (CSI-RS), for CSI measurement. Through measurement of the reference signals, the terminal device determines a situation of a current CSI, and indicates the current CSI to the network device according to the indication parameter information configured by the network device. The current CSI is provided for the network device to configure a reasonable and efficient data transmission manner based on the current channel situation.

Figure 2:
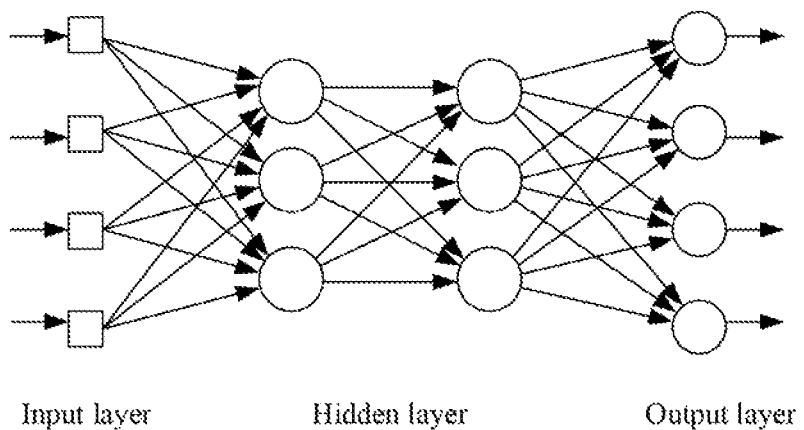
FIG. 2 is a schematic diagram of a basic structure of a simple neural network model in the present application.

Artificial intelligence has become a new way for people to solve and deal with problems. Herein, artificial intelligence based on a neural network is widely applied. FIG. 2 shows a schematic diagram of a basic structure of a simple neural network model. The network neural model includes: an input layer, a hidden layer and an output layer. Herein, the input layer is configured to receive data, the hidden layer is configured to process the data, and the output layer is configured to generate a computed result of the neural network model.

Figure 3:
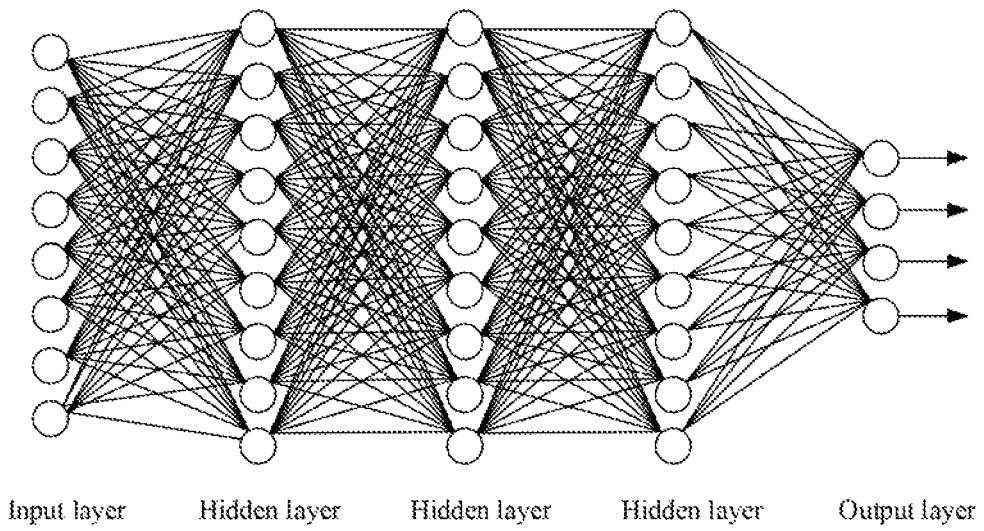
FIG. 3 is a schematic diagram of a basic structure of a deep neural network model in the present application.

With the continuous development of research on the neural network model, a neural network deep learning algorithm is proposed. FIG. 3 shows a schematic diagram of a basic structure of a deep neural network model. The deep neural network model includes multiple hidden layers. The deep neural network model including multiple hidden layers can greatly improve the data processing capability, and is widely applied in the aspects such as pattern recognition, signal processing, optimization combination and anomaly detection.

Figure 4:
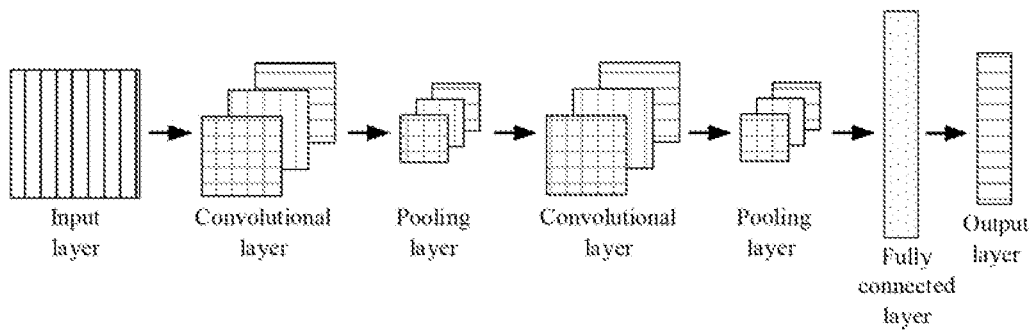
FIG. 4 is a schematic structural diagram of a convolutional neural network model in the present application.

With the development of the neural network deep learning algorithm, a convolutional neural network model is also further studied. FIG. 4 shows a schematic structural diagram of a convolutional neural network model, which may include: an input layer, at least one convolutional layer, at least one pooling layer, a fully connected layer, and an output layer. The introduction of the convolutional layer and the pooling layer can effectively control the sharp increase in the number of network parameters, which limits the number of network parameters, and mines the characteristics of the local structure, and therefore improves the robustness of a convolutional neural network algorithm.

The basic principle of the current wireless communication system is completed based on theoretical modeling and parameter selection of the actual communication environment. With the further enhancement of the requirements for the flexibility, adaptability, speed and capacity of a wireless communication system, the gain brought by a working manner of the wireless communication system based on a classical model theory is gradually weaken. In order to further improve the performance of the wireless communication system, a new wireless communication manner shall be found and adopted.

One implementation mode is that CSI feedback is performed using a neural network model. One advantage of performing CSI feedback using the neural network model is that the information after feedback is complete channel information instead of processed channel information, which is beneficial for the communication system to better utilize the channel information and the current channel state for data transmission.

Figure 5:
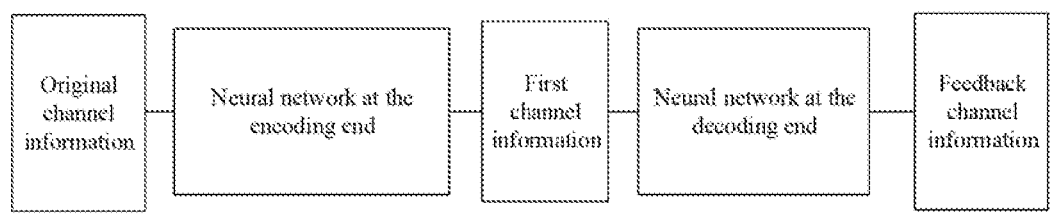
FIG. 5 is a schematic diagram of performing CSI feedback using a neural network model in the present application.

FIG. 5 shows a schematic diagram of performing CSI feedback using a neural network model. A terminal device generates first channel information from original channel information through the neural network model at the encoding end, and the neural network model at the decoding end generates feedback channel information from the first channel information through a decoding sub-model.

A method of performing CSI indication and channel quality information restoration based on a neural network model is a good attempt, but the applicant found the following problems when CSI indication and restoration of channel quality information restoration is performed based on the neural network model. First, for a certain type of a channel, it is more effective to construct an encoding network model and a decoding network model using a neural network model, so as to implement CSI indication and channel quality information restoration. However, the channel situation in the real physical world is complex and affected by the environment. Through a series of comparative experiments, the applicant found that when the channels with different characteristics and different types are indicated and restored using the neural network model, there are at least the following problems: (1) the restoration effect of channel indication and channel quality information is poor, (2) the neural network model is complex, and (3) the indication overhead required to indicate the CSI is relatively large, and the requirement for air interface transmission resources is relatively large.

Secondly, the channel situation in the real physical world is time-varying, so that it is difficult to effectively deal with the time-varying characteristics of the channel by using a specific neural network model to implement the encoding network model and the decoding network model. Similarly, the above problems may also exist, that is, (1) the channel indication and restoration effect is poor, (2) the neural network model is complex, and (3) the indication overhead required to indicate the CSI is relatively large, and the requirement for the air interface transmission resources is relatively large.

In summary, the applicant found that considering the environmental complexity and the time-varying characteristics of the channel, it is difficult to achieve better results in CSI indication and channel quality information restoration using a specific neural network mode, and the fundamental reason is that it is difficult to design a neural network model solution which has good generalization ability, is suitable for a variety of channel types, low computational complexity of model, low overhead of CSI indication, and excellent restoration effect of the channel quality information. In the comparative experiment of the applicant, some models are effective for the channel(s) in a scenario A, but fail directly for the channel(s) in a scenario B. Some models change with the time of the channel in the same scenario and have unstable performance for CSI indication and channel quality information restoration. At the same time, the applicant found that the above influences may be reduced to a certain extent by increasing the complexity of the neural network model and the scale of the channel state indication information of the neural network model, but at the same time the problems such as increased computational complexity, increased time delay and increased amount of transmitted data may be caused. These problems greatly limit the practical application of implementing CSI feedback and channel quality information restoration using the neural network model. Since in the actual communication network, for routine or even periodic frequent transmission and processing work of CSI feedback and channel quality information restoration, it is a big problem if the computational complexity is too large, the time delay is too long, and the amount of transmitted data is too large.

The technical solutions of the embodiments of the present application may be applied to various communication systems, such as a Global System for Mobile Communications (GSM), a Code Division Multiple Access (CDMA) system, a Wideband Code Division Multiple Access (WCDMA) system, a General Packet Radio Service (GPRS) system, a LTE system, a Frequency Division Duplex (FDD) system, a Time Division Duplex (TDD) system, an Advanced Long Term Evolution (LTE-A) system, an NR system, an evolution system of the NR system, an LTE-based Access to Unlicensed Spectrum (LTE-U) system, a NR-based Access to Unlicensed Spectrum (NR-U) system, a Universal Mobile Telecommunications System (UMTS), a Worldwide Interoperability for Microwave Access (WiMAX) communications system, a Wireless Local Area Network (WLAN), Wireless Fidelity (WiFi), a next generation of communication systems, or other communication systems.

System architecture and service scenarios described in the embodiments of the present application are intended to describe the technical solutions in the embodiments of the present application more clearly, but do not constitute limitations to the technical solutions provided in the embodiments of the present application. Those of ordinary skill in the art may know that as the network architecture evolves and a new service scenario emerges, the technical solutions provided in the embodiments of the present application are also applicable to a similar technical problem.

The network device involved in the embodiments of the present application may be a common base station (such as NodeB or Evolutional Node B (eNB) or gNB), a NR controller, a centralized unit, a NR base station, a remote radio frequency module, a micro base station, a relay, a distributed unit, a Transmission Reception Point (TRP), a Transmission Point (TP) or any other devices. No limits are made to specific technologies and specific device forms adopted by the network device in the embodiments of the present application. In order to facilitate description, in all embodiments of the present application, the above apparatuses providing a wireless communication function for the terminal device are collectively referred to a network device.

In the embodiments of the present application, the terminal device may be any terminal. For example, the terminal device may be User Equipment (UE) in Machine Type Communication (MTC). That is to say, the terminal device may also be called the UE, a Mobile Station (MS), a mobile terminal, a terminal, etc. The terminal device may communicate with one or more core networks through a Radio Access Network (RAN). For example, the terminal device may be a mobile terminal (or referred to as a "cellular" phone) and a computer with a mobile terminal. For example, the terminal device may also be a portable, pocket-sized, hand-held, computer built-in, or in-vehicle mobile apparatus, which exchanges language and/or data with the RAN. No specific limits are made thereto in the embodiments of the present application.

Optionally, the network device and the terminal device may be deployed on land, including indoors or outdoors, and may be held in hands or deployed in vehicles, or may be deployed on water, or may be deployed on an aircraft, a balloon, and an artificial satellite in the air. No limits are made to the application scenario of the network device and the terminal device in the embodiments of the present application.

Optionally, communication may be performed between the network device and the terminal device and between the terminal devices through a licensed spectrum, or through an unlicensed spectrum, or through the licensed spectrum and the unlicensed spectrum simultaneously. Communication may be performed between the network device and the terminal device and between the terminal devices through a spectrum less than 7 gigahertz (GHz), or through a spectrum greater than 7 GHz, or through the spectra less than 7 GHz and greater than 7 GHz simultaneously. No limits are made to the spectrum resource used between the network device and the terminal device in the embodiments of the present application.

Generally, traditional communication systems support a limited number of connections and are easy to implement. However, with the development of the communication technology, mobile communication systems will not only support traditional communication, but also support, for example, Device to Device (D2D) communication, Machine to Machine (M2M) communication, MTC, and Vehicle to Vehicle (V2V) communication, etc. The embodiments of the present application may also be applied to these communication systems.

Figure 6:
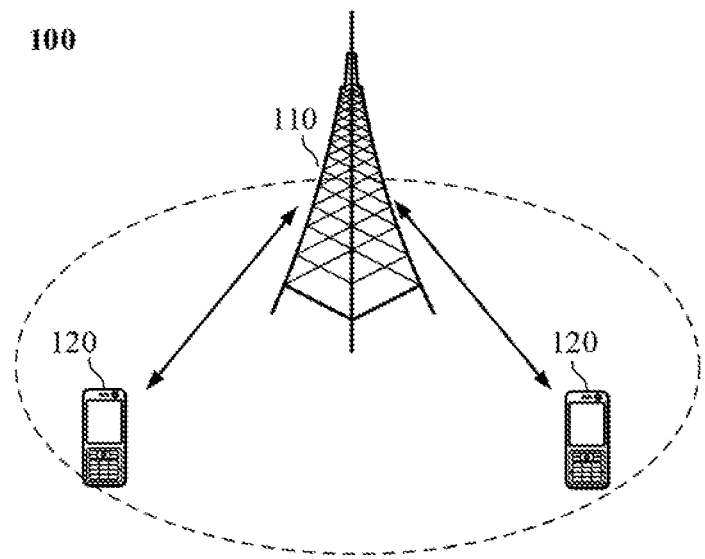
FIG. 6 is a schematic diagram of a composition structure of a communication system according to an embodiment of the present application.

Exemplarily, FIG. 6 shows a communication system 100 applied in embodiments of the present application. As shown in FIG. 6, the communication system 100 may include a network device 110, and the network device 110 may be a device communicating with a terminal device 120 (or called a communication terminal, or a terminal). The network device 110 may provide communication coverage for a specific geographical region and may communicate with a terminal device located in the coverage. Optionally, the network device 110 may be a Base Transceiver Station (BTS) in the GSM or the CDMA system, or may also be a NB in the WCDMA system, or may also be an eNB or eNodeB in the LTE system or a wireless controller in a Cloud Radio Access Network (GRAN). Or the network device may be a mobile switching center, a relay station, an access point, a vehicle device, a wearable device, a hub, a switch, a network bridge, a router, a network-side device in a 5G network, a network device in a future evolved Public Land Mobile Network (PLMN) or the like.

The communication system 100 further includes at least one terminal device within the coverage of the network device 110. A "terminal device" used herein includes, but is not limited to, a device arranged to receive/send a communication signal through a wired line connection, for example, through Public Switched Telephone Network (PSTN), Digital Subscriber Line (DSL), digital cable and direct cable connections; and/or another data connection/network); and/or through a wireless interface, for example, for a cellular network, a WLAN, a digital television network like a Digital Video Broadcasting-Handheld (DVB-H) network, a satellite network and an Amplitude Modulated (AM)—Frequency Modulated (FM) broadcast transmitter; and/or apparatuses, arranged to receive/send the communication signal, of another terminal device; and/or an Internet of Things (IoT) device. The terminal device arranged to communicate through a wireless interface may be called a "wireless communication terminal", a "wireless terminal" or a "mobile terminal." Examples of a mobile terminal include, but is not limited to, a satellite or cellular telephone, a Personal Communication System (PCS) terminal that is capable of combining a cellular radio telephone and data processing, faxing and data communication capabilities; a Personal Digital Assistant (PDA) that is capable of including a radio telephone, a pager, Internet/intranet access, a Web browser, a notepad, a calendar and/or a Global Positioning System (GPS) receiver; and a conventional laptop and/or palmtop receiver or another electronic device including a radio telephone transceiver. The terminal device may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a PDA, a handheld device with a wireless communication function, a computing device, another processing device connected to a wireless modem, an on-board device, a wearable device, a terminal device in the 5G network, a terminal device in the future evolved PLMN or the like.

Optionally, D2D communication may be performed between the terminal devices 120.

Optionally, the 5G system or the 5G network may also be called an NR system or an NR network.

FIG. 6 exemplarily shows a network device and two terminal devices. Optionally, the communication system 100 may include multiple network devices and another number of terminal devices may be included in coverage of each network device. There are no limits made thereto in the embodiments of the present application.

Optionally, the communication system 100 may further include other network entities such as a network controller and a mobility management entity. There are no limits made thereto in the embodiments of the present application.

It should be understood that a device with a communication function in the network/system in the embodiments of the present application may be called a communication device. For example, for the communication system 100 shown in FIG. 6, the communication device may include the network device 110 and terminal device 120 with the communication function. The network device 110 and the terminal device 120 may be the specific devices mentioned above and will not be elaborated herein. The communication device may further include other devices in the communication system 100, for example, other network entities such as a network controller and a mobility management entity. There are no limits made thereto in the embodiments of the present application.

Figure 7:
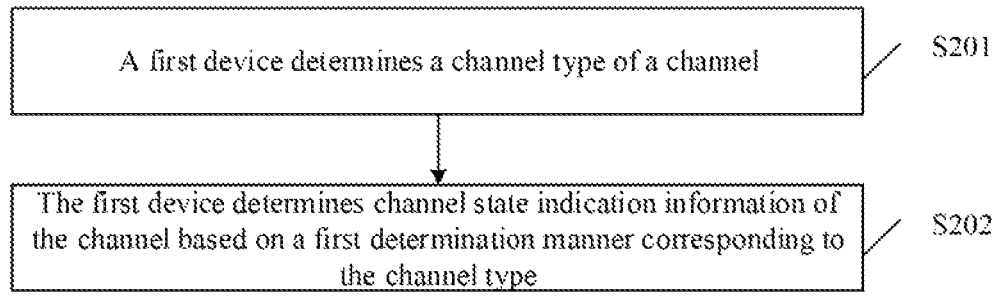
FIG. 7 is a schematic diagram of an optional processing flow of a method for processing CSI according to an embodiment of the present application.

FIG. 7 shows an optional processing flow of a method for processing CSI provided by an embodiment of the present application. As shown in FIG. 7, the method includes the following operations.

At S201, a first device determines a channel type of a channel.

In some embodiments, the first device may be a terminal device. Herein, the terminal device may be a terminal device in a traditional communication network, or a terminal device in D2D communication, or a terminal device in Vehicle to X (V2X) communication. The first device may also be a network device.

At S202, the first device determines channel state indication information of the channel based on a first determination manner corresponding to the channel type.

In some embodiments, the method may further include the following operations.

At S203, the first device sends the channel state indication information and/or the channel type to a second device.

In some embodiments, after determining the channel state indication information and the channel type, the first device may send the channel state indication information and/or the channel type to the second device. During specific implementation, the first device may send the channel state indication information and/or the channel type to the second device using at least one of the following: Uplink Control Information (UCI), a Physical Uplink Control Channel (PUCCH), a Physical Uplink Shared Channel (PUSCH), a Radio Resource Control (RRC) message, a message 1 (Msg1) in a four-step random access procedure, an Msg3 in the four-step random access procedure, or an MsgA in a two-step random access procedure.

In some embodiments, the first device may send a channel type identifier corresponding to the channel type and first identification information corresponding to the first determination manner to the second device, to notify the second device the channel type and the channel state indication information.

In some embodiments, the first device may periodically send the channel type to the second device. For example, the first device sends the channel type to the second device in a first period. The first period may be sent to the first device by the second device through first indication information. Herein, the first indication information includes at least one of the following: frequency domain resources for sending the channel type, the first period, or time within the First period. Alternatively, the first device may also send the channel type to the second device as required. For example, when the first device determines that the channel type of a current channel changes, the first device sends the channel type to the second device.

In some embodiments, in a case where the channel type changes, the first device may send an indication that the channel type is updated to the second device through second indication information, and indicate the updated channel type.

The method for processing CSI provided by the embodiments of the present application will be described in detail below.

For S201, the first device may determine the channel type based on a second determination manner.

Figure 8:
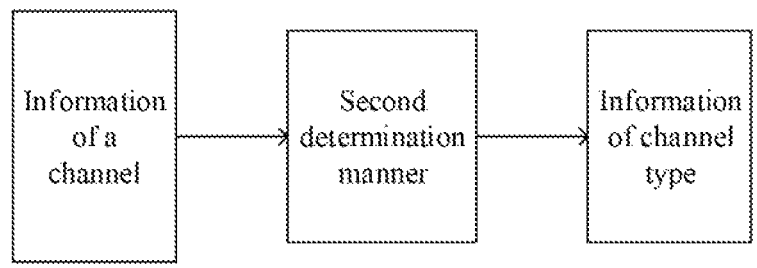
FIG. 8 is a schematic diagram of a processing flow for determining a channel type according to an embodiment of the present application.

In some embodiments, the second determination manner may be a second neural network model or a second algorithm, etc. When the first device determines the channel type through the second determination manner, as shown in FIG. 8, information of the channel may be used as input information of the second determination manner, and the output information of the second determination manner is the channel type. In a case where the second determination manner is the second neural network model, the second neural network model is a neural network model obtained by training with different dimensions of channel characteristics of the channel as granularity, with the channel quality information of the channel as input, and with the channel type of the channel as output. Herein, the channel characteristics may include at least one of the following: frequency, time delay, a transmitting antenna, a transmitting port, a transmitting angle, a receiving antenna, a receiving port, or a receiving angle. The information of the channel may include quality information of the channel. The quality information of the channel includes at least one of the following: Reference Signal Received Power (RSRP), Reference Signal Received Quality (RSRQ), a Received Signal Strength Indicator (RSSI), or a Signal-to-Noise and Interference Ratio (SINR).

Here, the second neural network model may include at least one fully connected layer, a normalization layer, an activation function, a convolutional layer, and a pooling layer, and may also include a specific network structure, such as a recurrent neural network structure, a Long Short-Term Memory (LSTM) structure.

In some embodiments, the second determination manner may be predetermined in a protocol or configured by the second device. In a case where the second determination manner is configured by the second device, the second device sends the second determination manner to the first device through first information. The first information may include at least one of the following: downlink data information, a Non-Access Stratum (NAS) message, a broadcast message, a multicast message, a RRC message, a Media Access Control Control Element (MAC CE), or Downlink Control Information (DCI). During specific implementation, each second determination manner may correspond to one piece of second identification information, and the second identification information may be sent to the first device. Herein, the second identification information corresponding to the second determination manner may be second identification information corresponding to the second neural network model, or second identification information corresponding to parameter information of the second algorithm.

In some embodiments, the second determination manner is valid under the first channel condition. That is, the second determination manner is valid under the channel environment conditions such as a certain time range and a space range. When the channel condition of a user changes obviously, a more matched second determination manner is necessary for the first device to determine the channel type, that is, the second determination manner is updated. In an embodiment of the present application, the second determination manner may be updated in at least one of the following manners, which will be described in detail below.

1) The first device actively updates the second determination manner.

Figure 9:
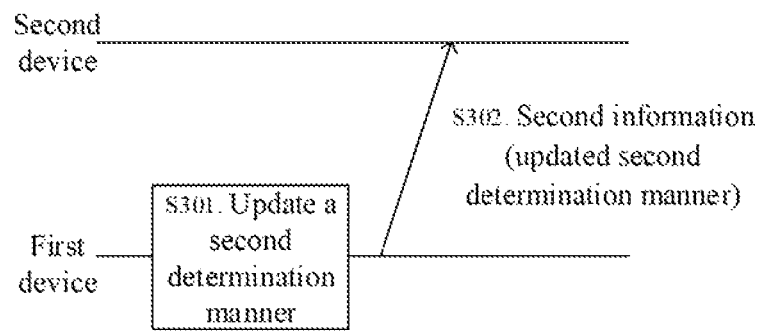
FIG. 9 is a schematic diagram of an optional processing flow for updating a second determination manner according to an embodiment of the present application.

In some embodiments, an optional processing flow for updating the second determination manner, as shown in FIG. 9, includes the following operations.

At S301, the first device updates the second determination manner.

In some embodiments, the first device updates the second determination manner in a case where the channel condition of the user changes significantly.

At S302, the first device sends second information to the second device. The second information is configured to indicate the updated second determination manner.

In some embodiments, the first device updates the second determination manner, and notifies through the second information the second device that the second determination manner is updated. If the first device updates the second neural network model, the second algorithm, or the second model, etc. which is configured to determine the channel type, the first device sends the parameters of the updated second determination manner to a second device through the second information. Alternatively, the first device sends the second identification information corresponding to the updated second determination manner to the second device.

In some embodiments, the second information may include at least one of the following: UCI, PUCCH, PUSCH, an RRC message, an Msg1 in a four-step random access procedure, an Msg3 in the four-step random access procedure, or an MsgA in the two-step random access procedure.

2) The first device updates the second determination manner according to a request of the second device.

Figure 10:
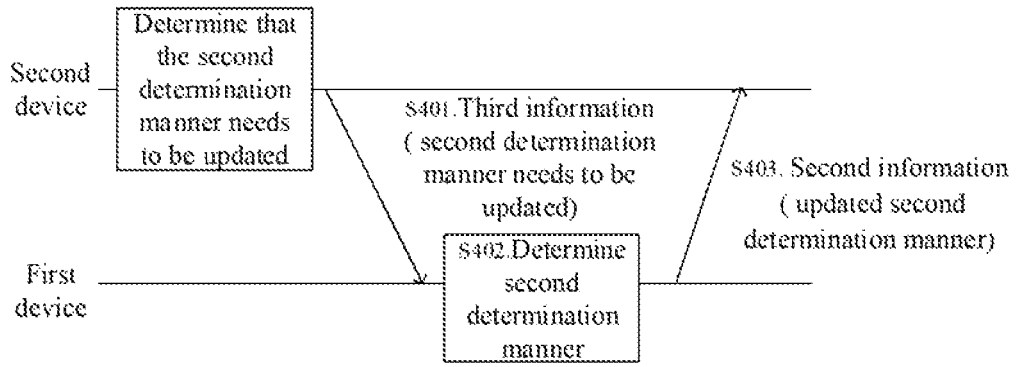
FIG. 10 is a schematic diagram of another optional processing flow for updating a second determination manner according to an embodiment of the present application.

In some embodiments, another optional processing flow for updating the second determination manner, as shown in FIG. 10, includes the following operations.

At S401, the second device sends third information to the first device. The third information is configured to request the first device to update the second determination manner.

In some embodiments, in a case where the second device determines that the second determination manner needs to be updated, the second device requests the first device to update the second determination manner through the third information.

In some embodiments, the third information includes at least one of the following: Msg2 in the four-step random access procedure, Msg4 in the four-step random access procedure, MsgB in the two-step random access procedure, DCI, a Physical Downlink Control Channel (PDCCH), a Physical Downlink Shared Channel (PDSCH), RRC information, a multicast message, a broadcast message, or downlink data information.

At S402, the first device updates the second determination manner.

In some embodiments, the first device updates the second determination manner according to the request of the second device.

At S403, the first device sends second information to the second device. The second information is configured to indicate the updated second determination manner.

In some embodiments, the first device updates the second determination manner, and notifies through the second information the second device that the second determination manner is updated. If the first device has updated the second neural network model, the second algorithm, or the second model, etc. configured to determine the channel type, the first device sends the parameters of the updated second determination manner to a second device through the second information. Alternatively, the first device sends the second identification information corresponding to the updated second determination manner to the second device.

In some embodiments, the second information may include at least one of the following: UCI, PUCCH, PUSCH, an RRC message, Msg1 in the four-step random access procedure, Msg3 in the four-step random access procedure, or MsgA in the two-step random access procedure.

3) The second device actively updates the second determination manner.

Figure 11:
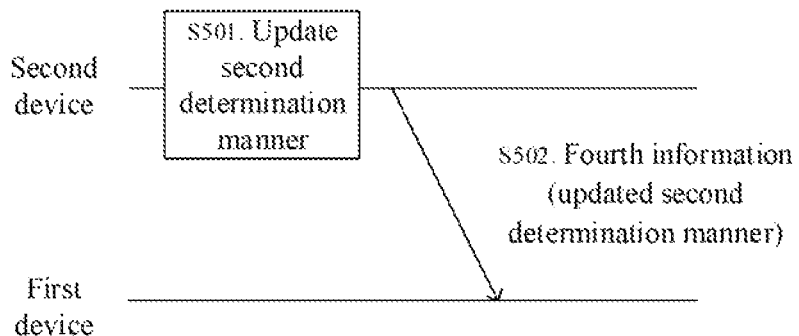
FIG. 11 is a schematic diagram of yet another optional processing flow for updating a second determination manner according to an embodiment of the present application.

In some embodiments, yet another optional processing flow for updating the second determination manner, as shown in FIG. 11, includes the following operations.

At S501, the second device updates the second determination manner.

In some embodiments, the second device updates the second determination manner in a case where the channel condition of the user changes significantly.

At S502, the second device sends fourth information to the second device. The fourth information is configured to indicate the updated second determination manner.

In some embodiments, the second device updates the second determination manner, and notifies through the fourth information the first device that the second determination manner is updated.

In some embodiments, the fourth information carries second identification information corresponding to the updated second determination manner; or, the fourth information carries parameters of the updated second determination manner.

In some embodiments, the fourth information includes at least one of the following: Msg2 in the four-step random access procedure, Msg4 in the four-step random access procedure, MsgB in a two-step random access procedure, DCI, PDCCH, PDSCH, RRC information, a multicast message, a broadcast message, or downlink data information.

4) The second device updates the second determination manner according to the request of the first device.

Figure 12:
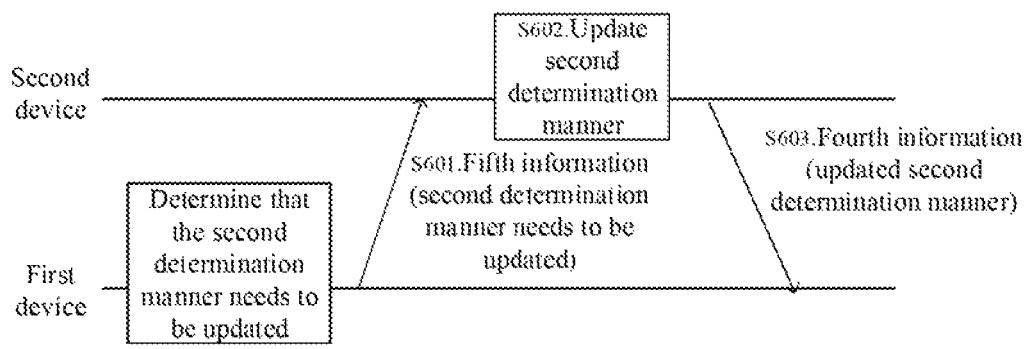
FIG. 12 is a schematic diagram of still another optional processing flow for updating a second determination manner according to an embodiment of the present application.

In some embodiments, still another optional processing flow for updating the second determination manner, as shown in FIG. 12, includes the following operations.

At S601, the first device sends fifth information to the second device. The fifth information is configured to request the second device to update the second determination manner.

In some embodiments, in a case where the first device determines that the second determination manner needs to be updated, the first device requests the first device to update the second determination manner through the fifth information.

In some embodiments, the fifth information includes at least one of the following: PUCCH, PUSCH, an RRC message, Msg1 in a four-step random access procedure, Msg3 in the four-step random access procedure, or MsgA in a two-step random access procedure.

At S602, the second device updates the second determination manner.

In some embodiments, the second device updates the second determination manner according to the request of the first device.

At S603, the second device sends fourth information to the first device. The fourth information is configured to indicate the updated second determination manner.

In some embodiments, the second device updates the second determination manner, and notifies through the fourth information the first device that the second determination manner is updated.

In some embodiments, the fourth information carries second identification information corresponding to the updated second determination manner; or, the fourth information carries parameters of the updated second determination manner.

In some embodiments, the fourth information includes at least one of the following: Msg2 in the four-step random access procedure, Msg4 in the four-step random access procedure, MsgB in a two-step random access procedure, DCI, PDCCH, PDSCH, RRC information, a multicast message, a broadcast message, or downlink data information.

For S202, multiple channel types may be preset, each channel type corresponds to one first determination manner, and the first determination manner is configured to determine channel state indication information of the channel. The channel state indication information is configured to indicate CSI.

In some embodiments, the first determination manner includes at least any one of the following: a first neural network model, a first encoding algorithm, and a first encoding model.

For example, there are twenty channel types, and each channel type corresponds to an encoding manner or an encoding neural network model. When the first device determines that the channel type is the ninth type of channel, the first device encodes original channel information using a ninth encoding manner or a ninth neural network model matched with the ninth type of channel as the encoding neural network model, so as to obtain channel state indication information.

Of course, in addition to the one-to-one correspondence, the corresponding relationship between the channel types and the first determination manners may also be a many-to-one relationship. For example, a group of channel types (one or multiple types of channels) may adopt a corresponding first determination manner, such as a specific encoding neural network, an encoding algorithm, or an encoding model, to encode the original channel information, and the channel state indication information indicating the CSI is obtained after encoding.

For another example, there are fifteen types of channels, the first type to fifth type of channel correspond to an encoding manner 1, the sixth type to tenth type of channel correspond to an encoding manner 2, and the eleventh type to fifteenth type of channel correspond to an encoding manner 3. The encoding manner adopted here may be an encoding neural network model. When the first device determines that the channel type is the seventh type of channel, correspondingly, the first device adopts the encoding manner 2 matched with the seventh type of channel, that is, the second neural network as the encoding neural network model.

Figure 13:
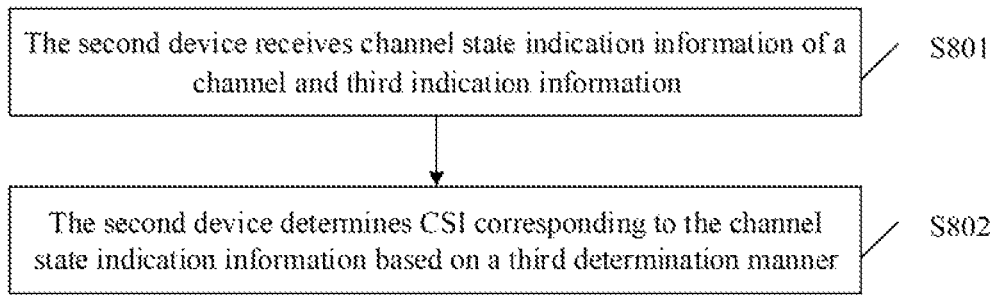
FIG. 13 is a schematic diagram of another optional processing flow of a method for processing CSI according to the embodiment of the present application.

FIG. 13 shows another optional processing flow of a method for processing CSI provided by the embodiments of the present application. As shown in FIG. 13, the method includes the following operations.

At S801, a second device receives channel state indication information of a channel and third indication information. The third indication information is configured to indicate a third determination manner.

In some embodiments, the second device may receive the channel state indication information and the third indication information from a first device through at least one of the following: UCI, PUCCH, PUSCH, an RRC message, Msg1 in a four-step random access procedure, Msg3 in the four-step random access procedure, or MsgA in a two-step random access procedure.

In some embodiments, the second device may determine the third determination manner through a channel type identifier corresponding to the channel type carried in the third indication information or first identification information corresponding to the first determination manner.

In some embodiments, the second device may receive the third indication information through sixth information. The sixth information includes at least one of the following: the UCI, the PUCCH, the PUSCH, the RRC message, the Msg1 in the four-step random access procedure, the Msg3 in the four-step random access procedure, or the MsgA in the two-step random access procedure. Herein, the third indication information may carry identification information corresponding to the channel type of the channel. The second device may determine the third determination manner corresponding to the channel type according to the identification information corresponding to the channel type. Alternatively, the third indication information may also carry first identification information configured to determine the first determination manner of the channel state indication information, and the second device determines the channel type according to the first identification information. For example, the third indication information carries identification information of an encoding neural network model configured to determine the channel state indication information, or the third indication information may also carry identification information of an encoding algorithm configured to determine the channel state indication information, or the third indication information may also carry identification information of an encoding model configured to determine the channel state indication information. The second device may determine the third determination manner according to the identification information carried in the third indication information. It may be understood that the third determination manner may be indicated by the identification information corresponding to the channel type, or may be indicated by the first identification information identifier of the first determination manner configured to determine the channel state indication information.

In some embodiments, the second device periodically receives the channel type sent by the first device. For example, the second device receives the channel type from the first device in a first period. The first period may be sent to the first device by the second device through first indication information. Herein, the first indication information includes at least one of the following: frequency domain resources for sending the channel type, the first period, or the time within the first period. Alternatively, the first device may also send the channel type to the second device as required. For example, when the first device determines that the channel type of a current channel changes, the first device sends the channel type to the second device.

At S802, the second device determines CSI corresponding to the channel state indication information based on the third determination manner corresponding to the channel type.

In some embodiments, the third determination manner includes at least any one of the following: a third neural network model, a third decoding algorithm, and a third decoding model. The second device decodes the channel state indication information using the third neural network model, the third decoding algorithm or the third decoding model, to obtain the CSI.

In some embodiments, multiple channel types may be preset, each channel type corresponds to one third determination manner, and the third determination manner is configured to decode channel state indication information. The channel state indication information is configured to indicate CSI.

For example, there are twenty channel types, and each type of channel corresponds to a decoding manner or a decoding neural network model. When the second device determines that the channel type is the ninth type of channel, the second device decodes the channel state indication information using a ninth decoding manner or a ninth neural network model matched with the ninth type of channel as the decoding neural network model, so as to obtain the CSI.

Of course, in addition to the one-to-one correspondence, the corresponding relationship between the channel types and the third determination manners may also be a many-to-one relationship. For example, a group of channel types (one or multiple types of channels) may adopt a corresponding third determination manner, such as a specific decoding neural network, a decoding algorithm, or a decoding model, to decode the channel state indication information, and the CSI is obtained after decoding.

For another example, there are fifteen types of channels, the first type to fifth type of channels correspond to a decoding manner 1, the sixth type to tenth type of channels correspond to a decoding manner 2, and the eleventh type to fifteenth types of channels correspond to a decoding manner 3. The decoding manner adopted here may be a decoding neural network model. When the second device determines that the channel type is the seventh type of channel, correspondingly, the second device adopts a second decoding manner matched with the seventh type of channel, that is, the second neural network as the decoding neural network model.

In some embodiments, the method may further include the following operations.

At S803, the second device receives second indication information. The second indication information is configured to indicate that the channel type is updated.

In some embodiments, in a case where the first device updates the channel type, the first device sends the second indication information to the second device. The second indication information is configured to indicate that the channel type is updated and the updated channel type.

In some embodiments, the method may further include the following operations.

At S804, the second device sends a second determination manner to the first device. The second determination manner is configured to determine the channel type by the first device.

In some embodiments, the second device sends the second determination manner to the first device through first information. The first information may include at least one of the following: downlink data information, NAS message, a broadcast message, the multicast message, an RRC message, MAC CE, or DCI. During specific implementation, each second determination manner may correspond to one piece of second identification information, and the second identification information may be sent to the first device. Herein, the second identification information corresponding to the second determination manner may be second identification information corresponding to the second neural network model, or second identification information corresponding to parameter information of the second algorithm.

In some embodiments, the second determination manner is valid under the first channel condition. That is, the second determination manner is valid under the channel environment conditions such as a certain time range and a space range. When the channel condition of a user changes significantly, the first device needs to determine the channel type using a more matched second determination manner, that is, the second determination manner is updated. The second determination manner may be updated by the manners shown in FIG. to FIG. 12 in the embodiments of the present application, which will not be repeated here.

In some embodiments, the second device may be a network device, and the first device may also be a terminal device. Herein, the terminal device may be a terminal device in a traditional communication network, a terminal device in D2D communication, or a terminal device in V2X communication.

Figure 14:
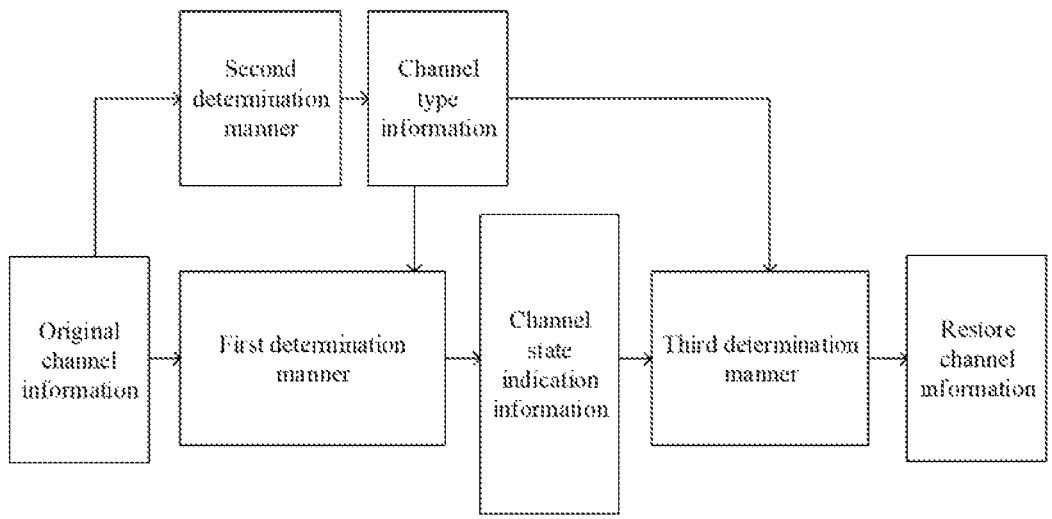
FIG. 14 is a schematic diagram of a detailed processing flow of a method for processing CSI according to an embodiment of the present application.

Based on the method for processing CSI shown in FIG. 7 and FIG. 13, FIG. 14 shows a detailed processing flow of a method for processing provided by an embodiment of the present application.

Original channel information is input into a channel type determining unit of a first device to determine a current channel type. For example, there are Y types of channels, and the channel type determining unit determines that the original channel information belongs to the X-th type of channel. After the channel type determining unit determines channel type information, the channel type information is input into an encoding unit of the first device, and the encoding unit adopts an encoding manner corresponding to the channel type information, such as a specific coding neural network, an encoding algorithm, or an encoding model, to encode the original channel information, and channel state indication information configured to indicate the CSI is obtained after encoding. The first device outputs the channel state indication information to a decoding unit of the second device, and outputs the channel type information to a decoding unit of the second device. The decoding unit adopts a decoding manner corresponding to the channel type information, such as a specific decoding neural network, a decoding algorithm, or a decoding model, to decode the channel state indication information, and the CSI is obtained after decoding.

In the above embodiments of the present application, in a case where the second determination manner is a second neural network model, the second neural network model is a neural network model obtained by training with different dimensions of channel characteristics of the channel as the granularity, channel quality information of the channel as the input, and the channel type of the channel as the output. Herein, the channel characteristics include at least one of the following: frequency, time delay, a transmitting antenna, a transmitting port, a transmitting angle, a receiving antenna, a receiving port, or a receiving angle. The channel quality information includes at least one of the following: the RSRP, the RSRQ, the RSSI, or the SINR.

For example, the second device trains the second neural network model with at least one of the frequency, the time delay, the transmitting antenna, the transmitting port, the transmitting angle, the receiving antenna, the receiving port, or the receiving angle as the granularity, and with at least one of the RSRP, the RSRQ, the RSSI, or the SINR as the input information, so that the second neural network model can predict the channel type.

It is to be noted that, in each embodiment of the present application, the communication between the first device and the second device may be implemented through a side link.

It should be understood that in various embodiments of the present application, in various embodiments of the present application, the magnitude of a sequence number of the processes as described above does not mean an execution sequence, and the execution sequence of each process should be determined by its function and an internal logic and should not form any limit to an implementation process of the embodiments of the present application.

In the method for processing CSI provided by the embodiments of the present application, a current channel type is determined by the second determination manner (such as the specific neural network model or the specific algorithm), the original channel information is encoded using the first determination manner matched with the determined channel type to obtain the channel state indication information, and the channel state indication information is decoded using the third determination manner matched with the determined channel type to obtain CSI. In this way, transmission of the CSI is performed based on the channel type, which can not only reduce the complexity of the first determination manner and the third determination manner, but also can improve the performance and utilization effect of the first determination manner and the third determination manner.

Figure 15:
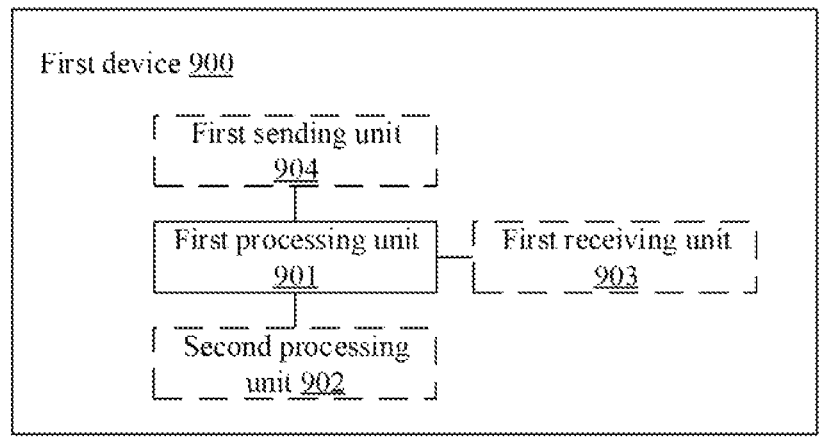
FIG. 15 is a schematic structural diagram of optional compositions of a first device according to the embodiment of the present application.

In order to implement the method for processing CSI as described above, the embodiments of the present application further provide a first device. FIG. 15 shows a composition structure of the first device. As shown in FIG. 15, the first device 900 includes: a first processing unit 901.

The first processing unit 901 is configured to determine a channel type of a channel, and determine channel state indication information of the channel based on a first determination manner corresponding to the channel type.

In some embodiments, the first processing unit 901 is configured to determine the channel type based on a second determination manner.

In some embodiments, the first processing unit 901 is configured to determine information of the channel as input information of the second determination manner, and use information output by the second determination manner as the channel type.

In some embodiments, the information of the channel includes: channel quality information of the channel.

In some embodiments, the second determination manner is predetermined in a protocol or configured by a second device.

In some embodiments, in a case where the second determination manner is configured by the second device, the second determination manner is sent to the first device by the second device through first information.

In some embodiments, the first information includes at least one of the following: downlink data information, a NAS message, a broadcast message, a multicast message, a RRC message, a MAC CE, or DCI.

In some embodiments, the first information carries second identification information corresponding to the second determination manner.

In some embodiments, the second determination manner is valid under a first channel condition.

In some embodiments, the first device 900 further includes: a second processing unit 902, configured to update the second determination manner.

In some embodiments, the second processing unit 902 is configured to send second information to the second device. The second information is configured to indicate the updated second determination manner.

In some embodiments, the second information carries second identification information corresponding to the updated second determination manner; or, the second information carries parameters of the updated second determination manner.

In some embodiments, the second information may include at least one of the following: UCI, a PUCCH, a PUSCH, an RRC message, an Msg1 in a four-step random access procedure, an Msg3 in the four-step random access procedure, or an MsgA in a two-step random access procedure.

In some embodiments, the first device 900 further includes: a first receiving unit 903, configured to receive third information sent by the second device. The third information is configured to request the first device to update the second determination manner.

In some embodiments, the third information includes at least one of the following: an Msg2 in the four-step random access procedure, an Msg4 in the four-step random access procedure, an MsgB in the two-step random access procedure, DCI, a PDCCH, a PDSCH, RRC information, a multicast message, a broadcast message, or downlink data information.

In some embodiments, the second processing unit 902 is configured to receive fourth information sent by the second device. The fourth information is configured to indicate the updated second determination manner.

In some embodiments, the fourth information carries second identification information corresponding to the updated second determination manner; or, the fourth information carries parameters of the updated second determination manner.

In some embodiments, the second processing unit 902 is configured to send fifth information to the second device. The fifth information is configured to request the second device to update the second determination manner.

In some embodiments, the fifth information includes at least one of the following: the PUCCH, the PUSCH, the RRC message, the Msg1 in the four-step random access procedure, the Msg3 in the four-step random access procedure, or the MsgA in the two-step random access procedure.

In some embodiments, the fourth information includes at least one of the following: the Msg2 in a four-step random access procedure, the Msg4 in the four-step random access procedure, the MsgB in a two-step random access procedure, the DCI, the PDCCH, the PDSCH, the RRC information, the multicast message, the broadcast message, or the downlink data information.

In some embodiments, the second determination manner includes at least any one of the following: a second neural network model and a second algorithm.

In some embodiments, in a case where the second determination manner is the second neural network model, the second neural network model is a neural network model obtained by training with different dimensions of channel characteristics of the channel as the granularity, channel quality information of the channel as input, and the channel type of the channel as output.

In some embodiments, the channel characteristics include at least one of the following:
frequency, time delay, a transmitting antenna, a transmitting port, a transmitting angle, a receiving antenna, a receiving port, or a receiving angle.

In some embodiments, the channel quality information includes at least one of the following: RSRP, RSRQ, a RSSI or a SINR.

In some embodiments, the first device 900 further includes: a first sending unit 904, configured to send the channel state indication information and/or third indication information to the second device. The third indication information is configured to indicate a third determination manner for decoding the channel state indication information.

In some embodiments, the first processing unit 901 is configured to send the third indication information through sixth information.

In some embodiments, the sixth information includes at least one of the following: the UCI, the PUCCH, the PUSCH, the RRC message, the Msg1 in the four-step random access procedure, the Msg3 in the four-step random access procedure, or the MsgA in the two-step random access procedure.

In some embodiments, the third indication information carries identification information corresponding to the channel type of the channel; or, the third indication information carries information of the first determination manner.

In some embodiments, the information of the first determination manner includes: first identification information corresponding to the first determination manner.

In some embodiments, the first sending unit 904 is configured to send the channel type in a first period.

In some embodiments, the first processing unit 901 is further configured to receive first indication information sent by the second device. The first indication information is configured to indicate the first period in which the first device sends the channel type.

In some embodiments, the first indication information includes at least one of the following: frequency domain resources for sending the channel type, the first period, or time within the first period.

In some embodiments, the second processing unit 902 is further configured to send second indication information to the second device. The second indication information is configured to indicate that the channel type is updated.

In some embodiments, the first determination manner corresponds to at least one channel type.

In some embodiments, the first determination manner includes at least any one of the following: a first neural network model, a first encoding algorithm, and a first encoding model.

In some embodiments, the first device includes a terminal device or a network device; and/or the second device includes a network device or a terminal device.

Figure 16:
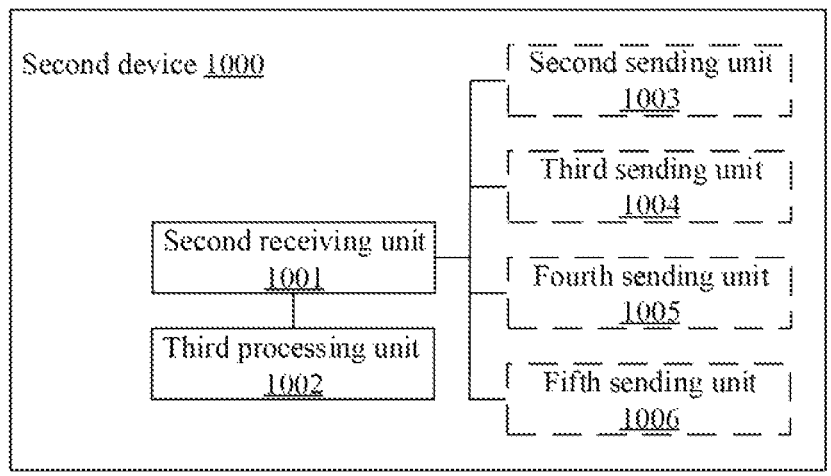
FIG. 16 is a schematic structural diagram of optional compositions of a second device according to an embodiment of the present application.

In order to implement the above method for processing CSI, the embodiments of the present application further provide a second device. FIG. 16 shows a schematic structural diagram of an optional composition structure of the second device 1000. As shown in FIG. 16, the second device includes: a second receiving unit 1001 and a third processing unit 1002.

The second receiving unit 1001 is configured to receive channel state indication information of a channel and third indication information. The third indication information is configured to indicate a third determination manner.

The third processing unit 1002 is configured to determine CSI corresponding to the channel state indication information based on the third determination manner.

In some embodiments, the second receiving unit 1001 is configured to receive the third indication information through sixth information.

In some embodiments, the sixth information includes at least one of the following: UCI, a PUCCH, a PUSCH, an RRC message, an Msg1 in a four-step random access procedure, an Msg3 in the four-step random access procedure, and an MsgA in the two-step random access procedure.

In some embodiments, the third indication information carries identification information corresponding to a channel type of the channel; or, the third indication information carries information of a first determination manner configured to determine the channel state indication information.

In some embodiments, information of the first determination manner includes: first identification information corresponding to the first determination manner.

In some embodiments, a third receiving unit is configured to receive the channel type in a first period.

In some embodiments, the second device 1000 further includes: a second sending unit 1003.

The second sending unit 1003 is configured to send first indication information to the first device. The first indication information is configured to indicate the first period in which the first device sends the channel type.

In some embodiments, the first indication information includes at least one of the following: frequency domain resources for sending the channel type, a first period, or time within the first period.

In some embodiments, the second receiving unit 1001 is further configured to receive second indication information. The second indication information is configured to indicate that the channel type is updated.

In some embodiments, the second device further includes: a third sending unit 1004.

The third sending unit 1004 is configured to send a second determination manner to the first device. The second determination manner is used to determine the channel type by the first device.

In some embodiments, the third sending unit 1004 is configured to send the second determination manner through first information.

In some embodiments, the first information includes at least one of the following: downlink data information, a NAS message, a broadcast message, a multicast message, a RRC message, a MAC CE, or DCI.

In some embodiments, the first information carries second identification information corresponding to the second determination manner.

In some embodiments, the second determination manner is valid under a first channel condition.

In some embodiments, the second receiving unit 1001 is further configured to receive second information. The second information is configured to indicate an updated second determination manner for determining the channel type.

In some embodiments, the second information carries second identification information corresponding to the updated second determination manner; or, the second information carries parameters of the updated second determination manner.

In some embodiments, the second information includes at least one of the following: UCI, a PUCCH, a PUSCH, an RRC message, an Msg1 in a four-step random access procedure, an Msg3 in the four-step random access procedure, or an MsgA in a two-step random access procedure.

In some embodiments, the second device 1000 further includes: a fourth sending unit 1005.

The fourth sending unit 1005 is configured to send third information to the first device. The third information is configured to request the first device to update the second determination manner.

In some embodiments, the third information includes at least one of the following: an Msg2 in the four-step random access procedure, an Msg4 in the four-step random access procedure, an MsgB in the two-step random access procedure, the DCI, a PDCCH, a PDSCH, RRC information, the multicast message, the broadcast message, or the downlink data information.

In some embodiments, the third processing unit 1002 is configured to update the second determination manner.

In some embodiments, the second device 1000 further includes: a fifth sending unit 1006.

The fifth sending unit 1006 is configured to send fourth information to the first device. The fourth information is configured to indicate the updated second determination manner.

In some embodiments, the second receiving unit 1001 is further configured to receive fifth information. The fifth information is configured to request the second device to update the second determination manner.

In some embodiments, the fifth information includes at least one of the following: the PUCCH, the PUSCH, the RRC message, the Msg1 in the four-step random access procedure, the Msg3 in the four-step random access procedure, or the MsgA in the two-step random access procedure.

In some embodiments, the fourth information includes at least one of the following: the Msg2 in a four-step random access procedure, the Msg4 in the four-step random access procedure, the MsgB in a two-step random access procedure, the DCI, the PDCCH, the PDSCH, RRC information, the multicast message, the broadcast message, or the downlink data information.

In some embodiments, the second determination manner includes at least any one of the following: a second neural network model and a second algorithm.

In some embodiments, in a case where the second determination manner is the second neural network model, the third processing unit is configured to train the second neural network model by using different dimensions of channel characteristics of the channel as granularity, channel quality information of the channel as input, and the channel type of the channel as output.

In some embodiments, the channel characteristics include at least one of the following:
frequency, time delay, a transmitting antenna, a transmitting port, a transmitting angle, a receiving antenna, a receiving port, or a receiving angle.

In some embodiments, the quality information of the channel includes at least one of the following: RSRP, RSRQ, RSSI or SINR.

In some embodiments, the third determination manner includes at least any one of the following: a third neural network model, a third decoding algorithm, and a third decoding model.

In some embodiments, the first device includes a terminal device or a network device: and/or the second device includes a network device or a terminal device.

The embodiments of the present application further provide a first device, which includes: a processor and a memory configured to store a computer program capable of running on the processor. Herein, the processor is configured to perform, when executing the computer program, the steps of the method for processing CSI executed by the first device as described above.

The embodiments of the present application further provide a second device, which includes: a processor and a memory configured to store a computer program capable of running on the processor. Herein, the processor is configured to perform, when executing the computer program, the steps of the method for processing CSI executed by the second device as described above.

The embodiments of the present application further provide a chip, which includes: a processor, configured to call from a memory and run a computer program to enable a device installed with the chip to perform the method for processing CSI executed by the first device as described above.

The embodiments of the present application provide a chip, which includes: a processor, configured to call from a memory and run a computer program to enable a device installed with the chip to perform the method for processing CSI executed by the above second device as described above.

The embodiments of the present application further provide a storage medium, storing an executable program that, when executed by a processor, implements the method for processing CSI executed by the first device as described above.

The embodiments of the present application further provide a storage medium, storing an executable program that, when executed by a processor, implements the method for processing CSI executed by the second device as described above.

The embodiments of the present application further provide a computer program product, which includes: a computer program instruction. The computer program instruction enables a computer to perform the method for processing CSI executed by the first device as described above.

The embodiments of the present application further provide a computer program product, which includes: a computer program instruction. The computer program instruction enables a computer to perform the method for processing CSI executed by the second device as described above.

The embodiments of the present application further provide a computer program, enabling a computer to perform the method for processing CSI executed by the first device as described above.

The embodiments of the present application further provide a computer program, enabling a computer to perform the method for processing CSI executed by the second device as described above.

Figure 17:
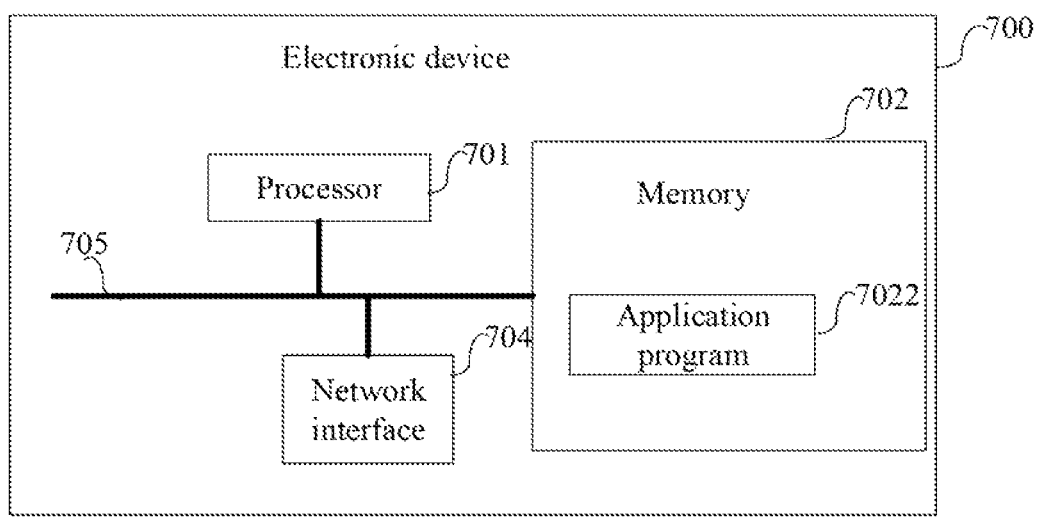
FIG. 17 is a schematic structural diagram of hardware compositions of an electronic device according to an embodiment of the present application.

FIG. 17 is a schematic structural diagram of hardware compositions of an electronic device (second device or first device) of an embodiment of the present application. The terminal device 700 includes: at least one processor 701, a memory 702 and at least one network interface 704. Various components of the terminal device 700 are coupled together through a bus system 705. It should be understood that the bus system 705 is configured to implement connection and communication between these components. In addition to a data bus, the bus system 705 further includes a power bus, a control bus, and a status signal bus. However, for clarity of description, various buses are marked as the bus system 705 in FIG. 17.

It should be understood that the memory 702 may be a volatile memory or a non-volatile memory, or may include both a volatile memory and a non-volatile memory. The non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a Flash Memory, a magnetic surface memory, an optical disk or a Compact Disc Read-Only Memory (CD-ROM); and the magnetic surface memory may be a magnetic disk memory or a magnetic tape memory. The volatile memory may be a RAM that acts as an external cache. By way of example and not limitation, many forms of RAM are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memory 702 described in the embodiment of the present application is intended to include, but is not limited to, these and any other suitable types of memories.

The memory 702 in the embodiment of the present application is configured to store various types of data to support operation of the electronic device 700. Examples of such data include: any computer application operated on the electronic device 700, such as an application program 7022. A program for implementing the method in the embodiment of the present application may be included in the application program 7022.

The method disclosed in the above embodiments of the present application may be applied to the processor 701, or may be implemented by the processor 701. The processor 701 may be an integrated circuit chip with signal processing capability. During implementation, the steps of the above method may be completed by hardware integrated logic circuits in the processor 701 or instructions in the form of software. The above processor may be a general-purpose processor, a Digital Signal Processor (DSP), or other programmable logic devices, discrete gate or transistor logic devices, discrete hardware components, or the like. The processor 701 may implement or perform various methods, steps, and logical block diagrams disclosed in the embodiments of the present application. The general-purpose processor may be a microprocessor, or any conventional processor. Steps of the methods disclosed with reference to the embodiments of the present application may be directly performed and accomplished by a hardware decoding processor, or may be performed and accomplished by a combination of hardware and software modules in the decoding processor. A software module may be located in a storage medium. The storage medium is located in the memory 702, and the processor 701 reads information in the memory 702 and completes the steps of the above method in combination with hardware thereof.

In an exemplary embodiment, the electronic device 700 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, MPUs, or other electronic elements for executing the above methods.

The present application is described with reference to flowcharts and/or block diagrams of the method, the device (system) and the computer program product according to the embodiments of the present application. It should be understood that each flow and/or block in the flowcharts and/or the block diagrams and a combination of the flows and/or the blocks in the flowcharts and/or the block diagrams may be implemented by computer program instructions. These computer program instructions may be provided for a general-purpose computer, a dedicated computer, an embedded processor or processors of other programmable data processing devices to generate a machine, so that an apparatus for achieving functions designated in one or more flows of the flowcharts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, so that a manufactured product including an instruction apparatus is generated via the instructions stored in the computer readable memory, and the instruction apparatus achieves the functions designated in one or more flows of the flowcharts and/or one or more blocks of the block diagrams.

These computer program instructions may also be loaded to the computers or the other programmable data processing devices, so that a series of operation steps are performed on the computers or the other programmable devices to generate processing implemented by the computers, and therefore the instructions executed on the computers or the other programmable devices provide a step of achieving the functions designated in one or more flows of the flowcharts and/or one or more blocks of the block diagrams.

It should be understood that the terms "system" and "network" in the present application are often used interchangeably herein. The term "and/or" in this application describes only an association relationship for describing associated objects and represents that three relationships may exist. For example, A and/or B may represent the following three cases: Only A exists, both A and B exist, and only B exists. In addition, the character "/" in the present application generally indicates an "or" relationship between the associated objects.

The descriptions above are only preferred embodiments of the present application and are not intended to limit the protection scope of the present application. Any modifications, equivalent replacements, improvements and the like made within the spirit and principle of the present application shall fall within the scope of protection of the present application.

The invention claimed is:

1. A first device, comprising:
a processor, and a memory configured to store a computer program capable of running on the processor, wherein the processor is configured to:
determine a channel type of a channel, and determine channel state indication information of the channel based on a first determination manner corresponding to the channel type, wherein the channel state indication information indicates channel state information, and the first determination manner comprises at least any one of a first neural network model, a first encoding algorithm, and a first encoding model; and
send the channel state indication information and third indication information to a second device, the third indication information being configured to indicate a third determination manner for decoding the channel state indication information, wherein the third determination manner comprises at least any one of a third neural network model, a third decoding algorithm, and a third decoding model.

2. The first device of claim 1, wherein the processor is further configured to determine the channel type of the channel based on a second determination manner, wherein the second determination manner comprises at least any one of a second neural network model and a second algorithm.

3. The first device of claim 2, wherein the processor is further configured to determine information of the channel as input information of the second determination manner, and determine information output by the second determination manner as the channel type,
wherein the information of the channel comprises channel quality information of the channel.

4. The first device of claim 2, wherein in a case where the second determination manner is configured by the second device, the second determination manner is sent to the first device by the second device through first information,
wherein the first information comprises at least one of the following:
downlink data information, a Non-Access Stratum (NAS) message, a broadcast message, a multicast message, a Radio Resource Control (RRC) message, a Media Access Control Control Element (MAC CE), or Downlink Control Information (DCI).

5. The first device of claim 4, wherein the first information carries second identification information corresponding to the second determination manner.

6. The first device of claim 2, wherein in a case where the second determination manner is a second neural network model, the second neural network model is a neural network model obtained by training with different dimensions of channel characteristics of the channel as granularity, with channel quality information of the channel as input, and with the channel type of the channel as output,
wherein the channel characteristics comprise at least one of the following:
frequency, time delay, a transmitting antenna, a transmitting port, a transmitting angle, a receiving antenna, a receiving port, or a receiving angle,
wherein the channel quality information comprises at least one of the following:

Reference Signal Received Power (RSRP), Reference Signal Received Quality (RSRQ), a Received Signal Strength Indicator (RSSI), or a Signal-to-Noise and Interference Ratio (SINR).

7. The first device of claim 1, wherein the processor is further configured to send the channel type in a first period.

8. The first device of claim 7, wherein the processor is further configured to receive first indication information sent by a second device, the first indication information being configured to indicate the first period in which the first device sends the channel type,
wherein the first indication information comprises at least one of the following:
frequency domain resources for sending the channel type, a first period, or time within the first period.

9. The first device of claim 1, wherein the processor is further configured to receive second indication information, the second indication information being configured to indicate that the channel type is updated.

10. A method for processing channel state information, comprising:
receiving, by a second device, channel state indication information of a channel and third indication information from a first device, the third indication information being configured to indicate a third determination manner for decoding the channel state indication information, wherein the third determination manner comprises at least any one of a third neural network model, a third decoding algorithm, and a third decoding model; and
determining, by the second device, channel state information indicated by the channel state indication information based on the third determination manner.

11. The method of claim 10, wherein the second device receives the third indication information through sixth information,
wherein the sixth information comprises at least one of the following:
Uplink Control Information (UCI), a Physical Uplink Control Channel (PUCCH), a Physical Uplink Shared Channel (PUSCH), a Radio Resource Control (RRC) message, a message 1 (Msg1) in a four-step random access procedure, an Msg3 in a four-step random access procedure, or an MsgA in a two-step random access procedure.

12. A second device, comprising:
a processor, and a memory configured to store a computer program capable of running on the processor, wherein the processor is configured to:
receive channel state indication information of a channel and third indication information from a first device, the third indication information being configured to indicate a third determination manner for decoding the channel state indication information, wherein the third determination manner comprises at least any one of a third neural network model, a third decoding algorithm, and a third decoding model; and
determine channel state information indicated by the channel state indication information based on the third determination manner.

13. The second device of claim 12, wherein the processor is further configured to receive the third indication information through sixth information,
wherein the sixth information comprises at least one of the following:
Uplink Control Information (UCI), a Physical Uplink Control Channel (PUCCH), a Physical Uplink Shared Channel (PUSCH), a Radio Resource Control (RRC) message, a message 1 (Msg1) in a four-step random access procedure, an Msg3 in a four-step random access procedure, or an MsgA in a two-step random access procedure.

14. The second device of claim 13, wherein the third indication information carries identification information corresponding to the channel type of the channel;
or, the third indication information carries information for determining a first determination manner of the channel state indication information, wherein the first determination manner comprises at least any one of a first neural network model a first encoding algorithm, and a first encoding model,
wherein the information of the first determination manner comprises:
first identification information corresponding to the first determination manner.

15. The second device of claim 12, wherein the processor is further configured to receive the channel type in a first period.

16. The second device of claim 15, wherein the processor is further configured to:
send first indication information to the first device, the first indication information being configured to indicate a first period in which the first device sends the channel type,
wherein the first indication information comprises at least one of the following:
frequency domain resources for sending the channel type, a first period, or time within the first period.

17. The second device of claim 12, wherein the processor is further configured to receive second indication information, the second indication information being configured to indicate that the channel type is updated.

18. The second device of claim 12, wherein the processor is further configured to:
send a second determination manner to the first device, the second determination manner being configured to determine the channel type by the first device, and the second determination manner comprising at least any one of a second neural network model and a second algorithm.

19. The second device of claim 18, wherein in a case where the second determination manner is a second neural network model, the processor is configured to train the second neural network model with different dimensions of channel characteristics of the channel as granularity, with channel quality information of the channel as input, and with the channel type of the channel as output.

* * * * *